(12) United States Patent
Jung et al.

(10) Patent No.: US 12,440,127 B2
(45) Date of Patent: *Oct. 14, 2025

(54) ELECTRONIC DEVICE AND METHOD OF ESTIMATING BIO- INFORMATION USING THE SAME

(71) Applicant: SAMSUNG ELECTRONICS CO., LTD., Suwon-si (KR)

(72) Inventors: Myoung Hoon Jung, Bucheon-si (KR); Yoon Jae Kim, Seoul (KR); Jin Young Park, Hwaseong-si (KR); Kun Sun Eom, Hwaseong-si (KR); Jeong Eun Hwang, Suwon-si (KR); Hyun Seok Moon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 838 days.

This patent is subject to a terminal disclaimer.

(21) Appl. No.: 17/707,418

(22) Filed: Mar. 29, 2022

(65) Prior Publication Data

US 2023/0141246 A1 May 11, 2023

(30) Foreign Application Priority Data

Nov. 11, 2021 (KR) ........................ 10-2021-0154636

(51) Int. Cl.
*A61B 5/00* (2006.01)
*A61B 5/145* (2006.01)
(Continued)

(52) U.S. Cl.
CPC ........ *A61B 5/1455* (2013.01); *A61B 5/14546* (2013.01); *A61B 5/1495* (2013.01);
(Continued)

(58) Field of Classification Search
CPC . A61B 5/1455; A61B 5/14546; A61B 5/1495; A61B 5/742; A61B 5/0075;
(Continued)

(56) References Cited

U.S. PATENT DOCUMENTS 7,365,839 B2 4/2008 Ferguson et al.
8,260,402 B2 9/2012 Ermakov et al.
(Continued)

FOREIGN PATENT DOCUMENTS

EP 3626163 A2 3/2020
KR 10-2019-0100814 A 8/2019
(Continued)

OTHER PUBLICATIONS

Communication issued Oct. 19, 2022 by the European Patent Office in European Patent Application No. 22175861.8.

*Primary Examiner* — Patrick Fernandes
*Assistant Examiner* — Shawn Curtis Broughton
(74) *Attorney, Agent, or Firm* — Sughrue Mion, PLLC

(57) ABSTRACT

An electronic device may include: an optical sensor configured to emit a reference light to a reference object and detect the reference light reflected from the reference object during calibration, and emit a measurement light to a target object and detect the measurement light reflected from the target object during a measurement; a display; and a processor configured to: when the electronic device is placed on a charger and is in a charging state, perform the calibration of the optical sensor based on the reference light reflected from the reference object; control the display to output guide information for estimating bio-information according to progress stages of the measurement after charging of the electronic device; and estimate the bio-information based on a light quantity of the measurement light that is reflected (Continued)

from the target object, and a light quantity of the reference light reflected from the reference object.

18 Claims, 17 Drawing Sheets

(51) Int. Cl.
    *A61B 5/1455*     (2006.01)
    *A61B 5/1495*     (2006.01)
    *G06F 3/041*     (2006.01)
    *G06F 3/042*     (2006.01)
    *G06F 3/0488*     (2022.01)
    *G16H 20/60*     (2018.01)
    *G16H 40/63*     (2018.01)

(52) U.S. Cl.
    CPC ............ *A61B 5/742* (2013.01); *G06F 3/0418* (2013.01); *G06F 3/042* (2013.01); *G06F 3/0488* (2013.01); *G16H 20/60* (2018.01); *G16H 40/63* (2018.01); *G06F 2203/04105* (2013.01)

(58) Field of Classification Search
    CPC ................ A61B 5/681; A61B 5/02416; A61B 2560/0223; G06F 3/0488
    See application file for complete search history.

(56) References Cited

U.S. PATENT DOCUMENTS

| | | | |
|---|---|---|---|
| 11,064,908 | B2 | 7/2021 | Park et al. |
| 2015/0216454 | A1* | 8/2015 | Kasahara ........... A61B 5/14532 600/479 |
| 2018/0024056 | A1 | 1/2018 | Kim |
| 2019/0274555 | A1 | 9/2019 | Park et al. |
| 2019/0313916 | A1 | 10/2019 | Oh et al. |
| 2020/0008693 | A1 | 1/2020 | Mukkamala et al. |
| 2020/0029873 | A1 | 1/2020 | Park et al. |
| 2020/0196935 | A1 | 6/2020 | Eom et al. |
| 2021/0022677 | A1 | 1/2021 | Kang et al. |
| 2021/0030367 | A1 | 2/2021 | Cho et al. |
| 2021/0113087 | A1 | 4/2021 | Jang et al. |
| 2021/0172867 | A1 | 6/2021 | Park et al. |

FOREIGN PATENT DOCUMENTS

| | | |
|---|---|---|
| KR | 10-2019-0107473 A | 9/2019 |
| KR | 10-2019-0120988 A | 10/2019 |
| KR | 10-2019-0143042 A | 12/2019 |
| KR | 10-2020-0012597 A | 2/2020 |
| KR | 10-2020-0025553 A | 3/2020 |
| KR | 10-2020-0077052 A | 6/2020 |
| KR | 10-2021-0047540 A | 4/2021 |

* cited by examiner

ELECTRONIC DEVICE AND METHOD OF ESTIMATING BIO- INFORMATION USING THE SAME

CROSS-REFERENCE TO RELATED APPLICATION(S)

This application claims priority from Korean Patent Application No. 10-2021-0154636, filed on Nov. 11, 2021, in the Korean Intellectual Property Office, the disclosure of which is incorporated herein by reference in its entirety.

BACKGROUND

1. Field

Apparatuses and methods consistent with example relate to estimating bio-information using an electronic device, and more particularly to non-invasively estimating antioxidant levels.

2. Description of the Related Art

Reactive oxygen species act as an important biological defense factor such as white blood cells protecting the body against infections. However, it has been known that excessive generation of reactive oxygen species in the body may lead to various tissue diseases. Common factors that cause the reactive oxygen species include stress, alcohol, peroxides, medicine, and the like. The reactive oxygen species produced by these factors may cause cranial nerve diseases, circulatory diseases, cancer, digestive tract diseases, liver diseases, arteriosclerosis, renal diseases, diabetes, aging, and the like. Our bodies have a series of antioxidant defense systems to protect against oxygen toxicity. For normal operation of the systems, it is essential to consume sufficient antioxidants such as vitamin E, vitamin C, carotenoid, flavonoid, and the like, and it is important to eat as many foods that are rich in antioxidants as possible for an effective antioxidant action. Accordingly, there is a need for an apparatus for easily identifying the amount of antioxidants in the body.

SUMMARY

According to an aspect of an example embodiment, there is provided an electronic device including: an optical sensor configured to emit a reference light to a reference object and detect the reference light reflected from the reference object during calibration, and emit a measurement light to a target object and detect the measurement light reflected from the target object during a measurement; a display; and a processor configured to: when the electronic device is placed on a charger and is in a charging state, perform the calibration of the optical sensor based on the reference light reflected from the reference object; control the display to output guide information for estimating bio-information according to progress stages of the measurement after charging of the electronic device; and estimate the bio-information based on a light quantity of the measurement light that is reflected from the target object, and a light quantity of the reference light reflected from the reference object.

The optical sensor may include a light source configured to emit the reference light onto the reference object during the charging state, and a detector configured to detect the reference light reflected from the reference object, wherein the processor may be further configured to store calibration information including the light quantity of the reference light, in a memory.

When charging of the electronic device is complete or when the electronic device is removed from the charger, the processor may be configured to output, on the display, a text message that guides a user to estimate the bio-information.

The processor may be further configured to determine an estimation recommendation time based on a user pattern, and based on a current time corresponding to the estimation recommendation time, output on the display, a text message that guides a user to estimate the bio-information.

In response to the target object coming into contact with the optical sensor, the processor may be further configured to determine a contact position and guide a user to change or maintain the contact position based on a determination of the contact position.

The processor may be further configured to: control the display to display at least one of a first graphic object indicating the contact position of the target object, a second graphic object indicating a predetermined measurement position, a third graphic object guiding movement from the contact position to the predetermined measurement position, and a fourth graphic object indicating that the contact position coincides with the predetermined measurement position.

The optical sensor may include a light source disposed at a center of the optical sensor, and a plurality of detectors arranged to surround the light source, wherein the processor may be further configured to determine the contact position of the target object based on absorbances measured by the plurality of detectors.

In response to a first portion of the target object coming into contact with a measurement position of the optical sensor, the processor may be further configured to control the display to output a graphic object indicating a contact pressure between the first portion and the optical sensor.

When a second portion of the target object comes into contact with the display and applies pressure to the display while the first portion is in contact with the optical sensor, the processor may be configured to output a pressure gauge in a region other than a contact region of the second portion on the display.

The processor may be further configured to change a color of the graphic object that indicates the contact pressure, according to the progress stages of the measurement.

The processor may be configured to output a text message, indicating a corresponding measurement stage among the progress stages of the measurement.

Upon completing estimation of the bio-information, the processor may be further configured to output an estimation result to the display.

The processor may be further configured to calculate absorbances at each wavelength of the measurement light based on the light quantity of the reference light that is measured during the calibration, and the light quantity of the measurement light measured from the target object, obtain a feature value based on the calculated absorbances at each wavelength, and estimate the bio-information based on the obtained feature value.

The processor may be further configured to combine the calculated absorbances at each wavelength, obtain an antioxidant peak by correcting a baseline of a waveform, and obtains an antioxidant level based on the obtained antioxidant peak by using a predefined antioxidant level estimation model.

According to an aspect of another example embodiment, there is provided a method of estimating bio-information by using an electronic device, the method including: in response to the electronic device being placed on a charger and being in a charging state, performing calibration of an optical sensor by emitting a reference light from the optical sensor to a reference object disposed on the charger, and detecting the reference light reflected from the reference object; guiding estimation of bio-information through a display, according to progress stages of a measurement after charging of the electronic device; measuring a light quantity of a measurement light that is emitted from the optical sensor to a target object and is detected by the optical sensor after being reflected from the target object; and estimating the bio-information based on the light quantity of the measurement light and a light quantity of the reference light.

The performing of the calibration may include: emitting the reference light onto the reference object by driving a light source of the optical sensor during the charging; detecting the reference light reflected from the reference object by using a detector of the optical sensor; and storing calibration information, including information of the light quantity of the reference light, in a memory.

The method may further include: when the charging is complete or when the electronic device is removed from the charger, outputting a text message that guides a user to estimate the bio-information, to the display.

In response to the target object coming into contact with the sensor, the guiding may include determining a contact position and guiding a user to change or maintain the contact position based on a determination of the contact position.

In response to a first portion of the target object coming into contact with a measurement position of the optical sensor, the guiding may include outputting a graphic object, guiding a contact pressure to be applied between the first portion and the optical sensor, to the display.

The estimating of the bio-information may include: calculating absorbances at each wavelength based on the light quantity of the reference light measured from the reference object during the calibration, and the light quantity of the measurement light that is measured from the target object; obtaining a feature value based on the calculated absorbances at each wavelength; and estimating the bio-information based on the obtained feature value.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
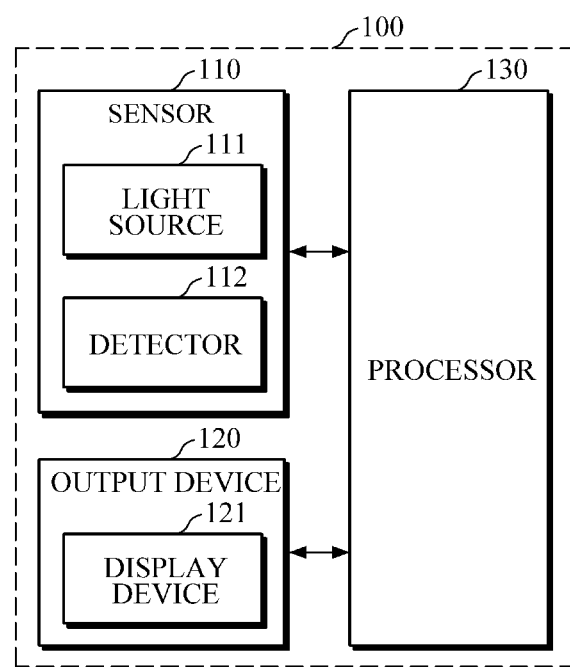
FIG. 1 is a block diagram illustrating an electronic device according to an example embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'unit' or 'module', etc., should be understood as a unit that performs at least one function or operation and that may be embodied as hardware, software, or a combination thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

An electronic device according to various embodiments of the present disclosure which will be described below may include, for example, at least one of a wearable device, a smartphone, a tablet PC, a mobile phone, a video phone, an electronic book reader, a desktop computer, a laptop computer, a netbook computer, a workstation, a server, a PDA, a portable multimedia player (PMP), an MP3 player, a medical device, and a camera. The wearable device may include at least one of an accessory type wearable device (e.g., wristwatch, ring, bracelet, anklet, necklace, glasses, contact lens, or head mounted device (HMD)), a textile/clothing type wearable device (e.g., electronic clothing), a body-mounted type wearable device (e.g., skin pad or tattoo), and a body implantable type wearable device. However, the wearable device is not limited thereto and may include home appliances, such as a television, a digital video disk (DVD) player, a stereo system, a refrigerator, an air conditioner, a vacuum cleaner, an oven, a microwave oven, a washing machine, an air cleaner, a set-top box, a home automation control panel, a security control panel, a media box, a game console, an electronic dictionary, an electronic key, a camcorder, an electronic picture frame, etc., or may include various medical devices, for example, various portable medical measuring devices (blood glucose monitoring device, heart rate monitor, blood pressure measuring device, thermometer, etc.), magnetic resonance angiography (MRA), magnetic resonance imaging (MRI), computed tomography (CT), imaging system, ultrasonic system, etc.). However, the electronic device is not limited to the above devices.

FIG. 1 is a block diagram illustrating an electronic device according to an example embodiment of the present disclosure.

Referring to FIG. 1, the electronic device 100 includes a sensor 110, an output device 120, and a processor 130.

The sensor 110 may be disposed on a first surface (e.g., a rear surface) of a main body of the electronic device 110, and may include a light source 111 and a detector 112. The sensor 110 may be implemented as any one or any combination of an optical health sensor, an antioxidant sensor, a blood glucose monitoring sensor, a triglyceride monitoring sensor, a blood alcohol detecting sensor, and a photoplethysmography (PPG) sensor. The light source 111 may include a light emitting diode (LED), a laser diode, a phosphor, and the like. There may be one or more light sources, each of which may emit light of different wavelengths (e.g., red wavelength, green wavelength, blue wavelength, infrared wavelength, etc.). For example, the light sources may emit light in a wavelength range of 400 nm to 600 nm. The detector 112 may include a photodiode (PD), a phototransistor (PTr), a Complementary Metal Oxide Semiconductor (CMOS) image sensor, a charge-coupled device (CCD) image sensor, and the like. The detector 112 may be formed as a single detector, a plurality of detectors, or a detector array. The plurality of detectors or the detector array may be formed in a predetermined shape, for example, a concentric circle with the detectors being arranged around the outside of the light source 111, or in various shapes, such as a square, a triangle, and the like.

The output device 120 may visually or non-visually output data generated or processed by the electronic device 100. The output device 120 may include a display device 121, as well as a sound output device, an audio module, and/or a haptic module, etc., which are not illustrated herein.

The display device 121 may visually provide information to the outside of the electronic device 100. The display device 121 may include, for example, a display, a hologram device, or a projector and control circuitry to control the devices. The display device 121 may include touch circuitry adapted to detect a touch, and/or sensor circuitry (e.g., force sensor, pressure sensor, etc.) adapted to measure the intensity of force incurred by the touch. In the following disclosure, the force sensor may also refer to the pressure sensor, and force measured by the force sensor may also refer to pressure. By contrast, the pressure sensor may also refer to the force sensor, and pressure measured by the pressure sensor may also refer to force.

The sound output device may output sound signals to the outside of the electronic device 100. The sound output device may include a speaker and/or a receiver. The speaker may be used for general purposes, such as playing multimedia or playing record, and the receiver may be used for incoming calls. The receiver may be implemented separately from, or as part of, the speaker.

The audio module may convert a sound into an electrical signal or vice versa. The audio module may obtain the sound via the input device, or may output the sound via the sound output device, and/or a speaker and/or a headphone of another electronic device directly or wirelessly connected to the electronic device.

The haptic module may convert an electrical signal into a mechanical stimulus (e.g., vibration, motion, etc.) or electrical stimulus which may be recognized by a user by tactile sensation or kinesthetic sensation. The haptic module may generate and apply forces, vibrations, or motions to a user. The haptic module may include, for example, a motor, a piezoelectric element, and/or an electric stimulator.

The processor 130 may be electrically or wirelessly connected to various components of the electronic device 100, such as the sensor 110, the output device 120, etc., so as to control these components and to perform various data processing or computation.

For example, by controlling the sensor 110 and using light quantity data of light received by the detector 112 of the sensor 110, the processor 130 may perform calibration of the sensor 110 and/or may estimate bio-information. In particular, the bio-information may be antioxidant levels, including a concentration of carotenoid accumulated in skin. However, this is merely an example, and the bio-information may include a variety of information including blood glucose, triglyceride, alcohol, lactate, skin pigment, bloodstream amount, and the like.

First, the processor 130 may perform calibration of the sensor 110 using a reference object. In particular, the reference object may be a reflector (e.g., 100% reflection mirror, white reflector), or an object coated with a reflective material. The reflective material may be a diffuse reflection material having a reflectivity of 1% to 99%, and may be, for example, Barium sulfate (BaSO4), Teflon (PTFE), etc., but is not limited thereto.

For example, the reference object may be formed on one surface of a charger, i.e., a surface opposite to or coming into contact with a first surface of a main body when the main body of the electronic device 110 is placed on the charger. For example, when a user places the main body on the charger for charging the electronic device 100, the processor 130 may sense a charging state and may automatically start to perform calibration during charging. However, even in the charging state, the processor 130 may not perform calibration if calibration conditions are not satisfied, including a case where a predetermined calibration cycle is not started, or a case where a residual battery capacity until charging is complete is less than or equal to a threshold (20%), and the like.

The processor 130 may drive the light source 111 of the sensor 110 to emit light onto the reference object of the charger, and may store a quantity of light, reflected from the reference object and detected by the detector 112, as a reference light quantity. The processor 130 may repeat or iterate this process a number of times, and may obtain a statistical value (e.g., an arithmetic mean value, a weighted mean value, a median value, a mode, a valley value, a peak value, etc.) of quantities of the reflected light, detected each number of times, as the reference light quantity of the light source. In addition, when the plurality of detectors 112 detect light quantities for each light source 111, the processor 130 may obtain a statistical value (e.g., an arithmetic mean value, a weighted mean value, a median value, a mode, a valley value, a peak value, etc.) of the light quantities detected by the respective detectors 112 as the reference light quantity of the corresponding light source.

In another example, the reference object may be a reflector, such as paper, a holder with no charging function, etc., which may be easily used by a user, and in response to a user's request, the processor 130 perform calibration by using a user's reflector. In this case, reflectivity may vary depending on a type of the user's reflector, such that in order to correct the reflectivity, the processor 130 may perform primary calibration at the initial time of use of the user's reflector, at predetermined calibration intervals, or in response to a user's request, by using the reference object formed on the charger, and then may perform secondary calibration by using the user's reflector and may correct the secondary calibration based on a result of the primary calibration.

Then, the processor 130 may determine a measurement state of the electronic device 100, and while providing a user with appropriate guide information for each stage through the output device 120 disposed on a second surface of the main body, the processor 130 may estimate bio-information by using the measured light quantity detected from a first portion (e.g., index finger) of the object and the calibration result.

For example, if the electronic device 100 is in a state before estimating bio-information, the processor 130 may output visual information for guiding a user to estimate bio-information at a predetermined time of recommendation for estimation. For example, when the electronic device 100 is placed on the charger and calibration is performed during charging, the processor 130 may output a text message, indicating estimation recommendation, at a time when the charging is complete or when the user removes the electronic device 100 from the charger to use the electronic device 100. In this case, the processor 130 may further output an estimation recommendation alarm by a sound signal, vibrations, tactile sensation, etc., using a sound output device, a haptic device, and the like of the output device 120.

Alternatively, by analyzing user patterns, such as a predetermined user preferred measurement time, a significant change in bio-information before a measurement time, or a change in life patterns, such as drinking, exercise, etc., the processor 130 may determine an estimation recommendation time, and upon determining that the estimation recommendation time has come, the processor 130 may output a text message, guiding a user to estimate bio-information, to the display device 121.

Subsequently, when a user places a first portion on the sensor 110 for estimating bio-information, the processor 130 may display appropriate guide information on the display device 121 for each stage of estimation.

First, the processor 130 may determine a contact position of the first portion of the object being in contact with the sensor 110, and may guide the user on a measurement position of the sensor 110 through the display device 121. In the case where the light source 111 of the sensor 110 is disposed at the center thereof, and the plurality of detectors 112 are arranged around the outside of the light source 111, the processor 130 may calculate absorbance of each detector 112 based on quantities of light received by the respective detectors 112, and may determine a contact position of the object based on the absorbance.

For example, if the contact position of the first portion does not coincide with the measurement position, the processor 130 may output a graphic object indicating the contact position, a graphic object indicating the measurement position, and/or a graphic object guiding movement from the contact position to the measurement position, and the like on the display device 121. The processor 130 may repeat the process, and if the contact position finally coincides with the measurement position or falls within a predetermined threshold range (e.g., a distance between the center of a touched fingerprint of the index finger and a center point of the measurement position being less than or equal to a threshold value), the processor 130 may output a graphic object, indicating that the contact position coincides with the measurement position, to the display device 121.

In another example, based on characteristics of the first portion, for example, if the first portion does not cover the entire surface of the sensor 110, the processor 130 may determine the detector 112, which is in contact with the first portion, based on the absorbance measured by the detector 112 rather than repeatedly guiding the measurement position as described above, and may proceed to a next process to measure a bio-signal by using the detector 112 being in contact with the first portion. In this case, if a contact region of the first portion does not satisfy a predetermined number of detectors 112, or if the sensor 110 fails to come into contact with a predetermined range (e.g., 70%) of the contact region, the processor 130 may guide the measurement position as described above.

Next, once the first portion comes into contact with the predetermined measurement position according to the guide, the processor 130 may guide measurement pressure through the display device 121. For example, if the user places a second portion (e.g., thumb) on the display device 121 and applies pressure thereto while placing the first portion on the measurement position of the sensor 110, the processor 130 may display a graphic object (e.g., pressure gauge), indicating the applied pressure and/or reference pressure, on an outer region of the display device 121 which is not in contact with the second portion.

In this case, the processor 130 may output the graphic object in different colors or shapes according to progress stages (e.g., before measurement, during measurement, or after measurement) or based on a pressurization state. In addition, during measurement, i.e., while the light source 111 of the sensor 110 emits light onto the first portion, and the detector 112 detects light scattered or reflected from the first portion, the processor 130 may output, on the graphic object guiding the measurement pressure or at another position, a text message indicating that the measurement is in progress, and/or an alarm message indicating that the measurement is in progress as a sound signal using the sound output device. In addition, if the measurement is in progress or if the applied pressure falls outside a threshold range of the reference pressure, the processor 130 may cause the graphic object or the text message to flicker.

Then, when the sensor 110 completes the measurement, the processor 130 may calculate absorbance at each wavelength based on the measured light quantity and the reference light quantity, and may extract a feature value by using the absorbance at each wavelength. For example, the processor 130 may calculate a feature value by combining the calculated absorbances and correcting a baseline of a waveform. The processor 130 may obtain bio-information by applying the obtained feature value to a predefined estimation model. The following Equations 1 to 3 represent an example of calculating absorbance at each wavelength and determining antioxidant levels based on the calculation.

$$A(\lambda) = -\log_{10} \frac{I_m}{I_0} \quad \text{[Equation 1]}$$

Herein, $A(\lambda)$ denotes the absorbance at each wavelength, $I_m$ denotes the measured light quantity, which is measured from the first portion of the object at a specific wavelength, and $I_0$ denotes the reference light quantity obtained by calibration at the specific wavelength.

$$AO = A_{\lambda 2} - \left(\frac{\lambda_3 - \lambda_2}{\lambda_3 - \lambda_1}\right) \times A_{\lambda 1} - \left(\frac{\lambda_2 - \lambda_1}{\lambda_3 - \lambda_1}\right) \times A_{\lambda 3} \quad \text{[Equation 2]}$$

Herein, AO denotes, as an example of the feature value, an antioxidant peak obtained by combining the absorbances at each wavelength and correcting the baseline of the waveform; $\lambda_1$, $\lambda_2$, and $\lambda_3$ denote wavelengths; and $A_{\lambda 1}$, $A_{\lambda 2}$, and $A_{\lambda 3}$ denote the absorbances at each wavelength which are obtained using Equation 1, in which the wavelengths are relatively long in the order of $\lambda_1$, $\lambda_2$, and $A\lambda_3$.

$$Y=a \times AO+b \qquad \text{[Equation 3]}$$

Herein, Y denotes the antioxidant level, AO denotes the antioxidant peak, and a and b denote predetermined values. While Equation 3 denotes an antioxidant level estimation model which is defined as a linear function equation, the equation is not limited thereto and may be defined as a nonlinear function equation, such as a logarithmic function equation, an exponential function equation, and the like.

Then, the processor 130 may provide a bio-information estimation result to a user through the output device 120. For example, the processor 130 may display information, such as an estimated bio-information value, an estimation history graph, recommendations based on the estimated bio-information value, etc., and along with the information, the processor 130 may output alarm information by using a sound output device, a haptic device, and the like.

Figure 2:
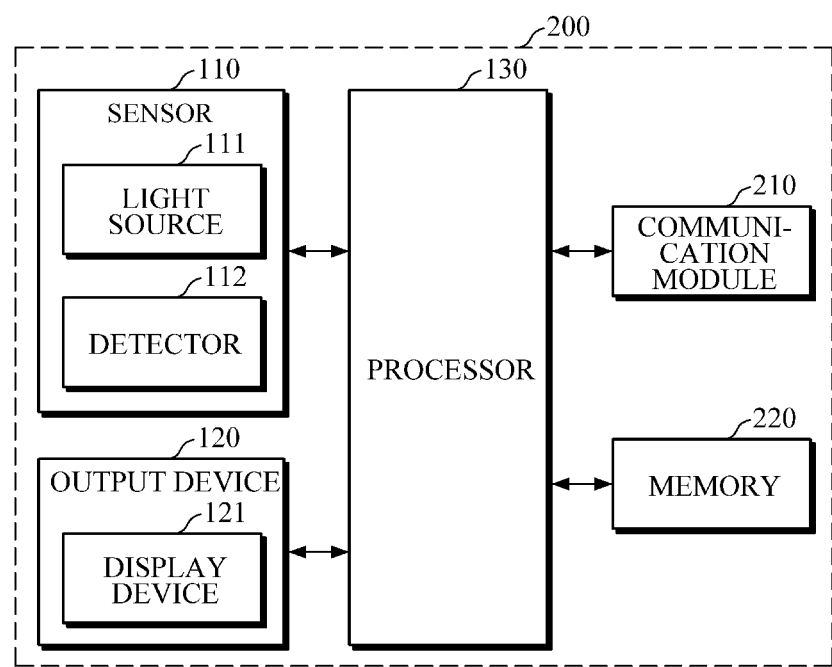
FIG. 2 is a block diagram illustrating an electronic device according to another example embodiment of the present disclosure.

FIG. 2 is a block diagram illustrating an electronic device according to another example embodiment of the present disclosure.

Referring to FIG. 2, an electronic device 200 includes the sensor 110, the output device 120, the processor 130, a communication module 210, and a memory 220. The sensor 110, the output device 120, and the processor 130 are described above, such that a detailed description thereof will be omitted.

The communication module 210 may support establishment of a direct (e.g., wired) communication channel and/or a wireless communication channel between the electronic device and other electronic device, a server, or the sensor device within a network environment, and performing of communication via the established communication channel. The communication module 210 may include one or more communication processors that are operable independently from the processor 130 and support a direct communication and/or a wireless communication. The communication module 210 may include a wireless communication module, e.g., a cellular communication module, a short-range wireless communication module, or a global navigation satellite system (GNSS) communication module, etc., and/or a wired communication module, e.g., a local area network (LAN) communication module, a power line communication (PLC) module, and the like. These various types of communication modules may be integrated into a single chip, or may be separately implemented as multiple chips. The wireless communication module may identify and authenticate the electronic device 200 in a communication network by using subscriber information (e.g., international mobile subscriber identity (IMSI), etc.) stored in a subscriber identification module.

For example, the communication module 210 may transmit necessary data so that an external device (e.g., smartphone, desktop PC) may output guide information for estimating bio-information at the same time when the output device 120 outputs guide information for estimating bio-information, and when the processor 120 completes estimation of bio-information, the communication module 210 may transmit a bio-information estimation result to the external device so that the estimation result may be output in various manners. Further, the communication module 210 may receive various data related to operation (e.g., estimation of bio-information) of the electronic device 200 from the external device.

The memory 220 may store operating conditions for operating the sensor device, and various data required for other components of the electronic device. The various data may include, for example, software and input data and/or output data for a command related thereto. For example, the memory may store, as calibration results (e.g., the reference light quantity $I_0$ obtained through calibration to be used in Equation 1), various data including the reference light quantity, the estimated bio-information value, the bio-information estimation model, and/or user characteristic information, such as a user's age, gender, health condition, and the like.

The memory 220 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

Hereinafter, various examples of visual guiding by the electronic devices 100 and 200 will be described with reference to FIGS. 3 to 8C.

Figure 3:
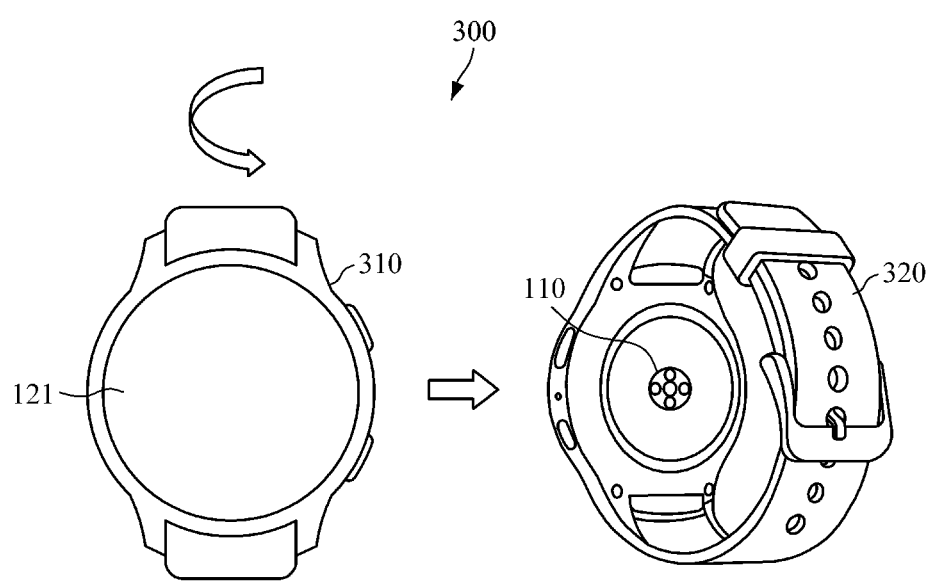
FIG. 3 is a diagram illustrating a smart watch wearable device according to an example embodiment of the present disclosure.

FIG. 3 illustrates a smart watch wearable device as an example of the above electronic devices 100 and 200.

Referring to FIG. 3, the wearable device 300 includes a main body 310 and a strap 320. The main body 310 forms the exterior of the wearable device 300, and may have the display device 121 formed on a front surface thereof as illustrated herein, such that a variety of information including time information, received message information, bio-information estimation guide information, bio-information estimation results, and the like may be displayed thereon. Further, the sensor 110 may be disposed on a rear surface of the main body 310. Although not illustrated herein, a force sensor may be further disposed at a lower end of the sensor 110. The force sensor may measure a force applied when a user presses the sensor with a finger. If a force measured by the force sensor is equal to or greater than a threshold value, the processor 130 mounted in the main body 310 may calculate antioxidant levels based on an optical signal measured by the detector 112. In another example, the force sensor may be disposed at a lower end of the display device 121. In this case, the force sensor may measure a force applied when the user presses the display device 121.

Figure 4:
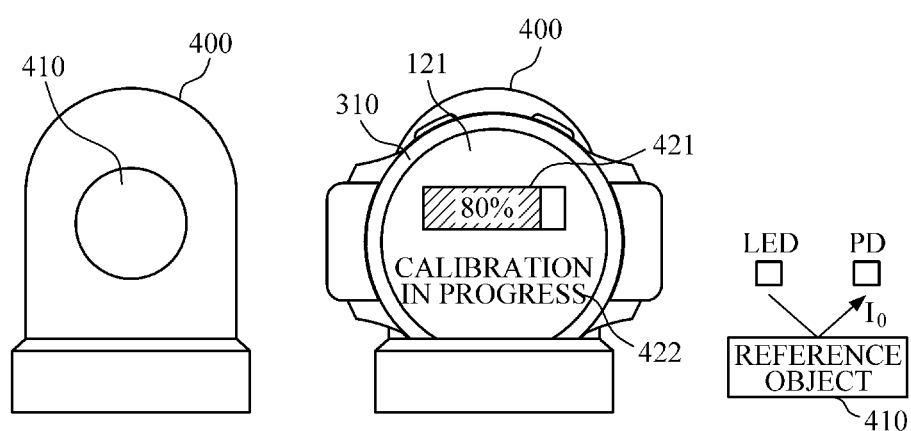
FIG. 4 is a diagram explaining an example of performing calibration of a sensor of an electronic device.

FIG. 4 is a diagram explaining an example of performing calibration of a sensor of an electronic device.

Referring to FIGS. 3 and 4, the smartwatch wearable device 300 may be placed on a charger 400 for wired or wireless charging. A reference object 410400 may be disposed on the charger 400. As illustrated herein, the reference object 410 may be disposed at a position coming into contact with or opposite to the sensor 110, disposed on a rear surface of the main body 310, when the main body 310 of the wearable device 300 is placed on the charger 400. The reference object may be a reflector (e.g., 100% reflection mirror, white reflector), or an object coated with a reflective material, for example, a diffuse reflection material having a reflectivity of 1% to 99%, and may be, for example, Barium sulfate (BaSO4), Teflon (PTFE), and the like.

When the main body 310 of the wearable device 300 is placed on the charger 400, the processor 130 may automatically start to sense a charging state, and may output a status bar 421, indicating a charging level, to the display device 121. Further, while the wearable device 300 is in a charging state, the processor 130 may perform calibration of the sensor, and at the same time may display a text message 422, indicating that calibration is in progress, on the display device 422. For example, the processor 130 may control the sensor 110 to emit light onto the reference object and to detect light reflected from the reference object 410 and may store the detected light quantity as the reference light quantity $I_0$ in the memory 220.

Figure 5:
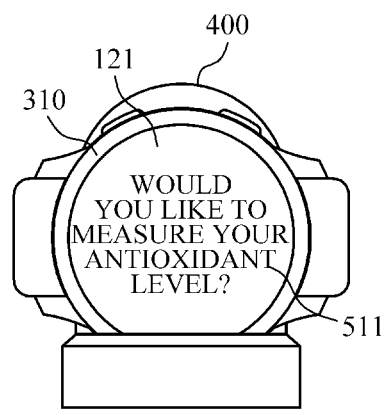
FIG. 5 is a diagram explaining an example of guiding estimation of bio-information.

FIG. 5 is a diagram explaining an example of guiding estimation of bio-information.

The processor 130 may determine a bio-information measurement state, and if the electronic device is in a state before measuring bio-information, the processor 130 may display information for recommending estimation of bio-information on the display device 121. For example, as illustrated herein, when charging is complete while the main body 310 is placed on the charger 400, the processor 130 may display a text message 511, such as "would you like to measure your antioxidant level?", on the display device 121. Alternatively, the processor 130 may output a message 511 for recommending estimation of bio-information at a time when a user removes the main body 310 from the charger 400 to use the wearable device 300 or at predetermined intervals. Alternatively, when a user does intense exercise while wearing the wearable device 300 on the wrist, if a user pattern changes, such as in the case where health-related data including an antioxidant level, an alcohol level, blood pressure, blood glucose, triglyceride, and the like during a predetermined period, fall outside a predetermined range, the processor 130 may output a text message for recommending estimation of bio-information.

FIGS. 6A to 6D are diagrams explaining an example of guiding a measurement position of a bio-signal.

Figure 6A:
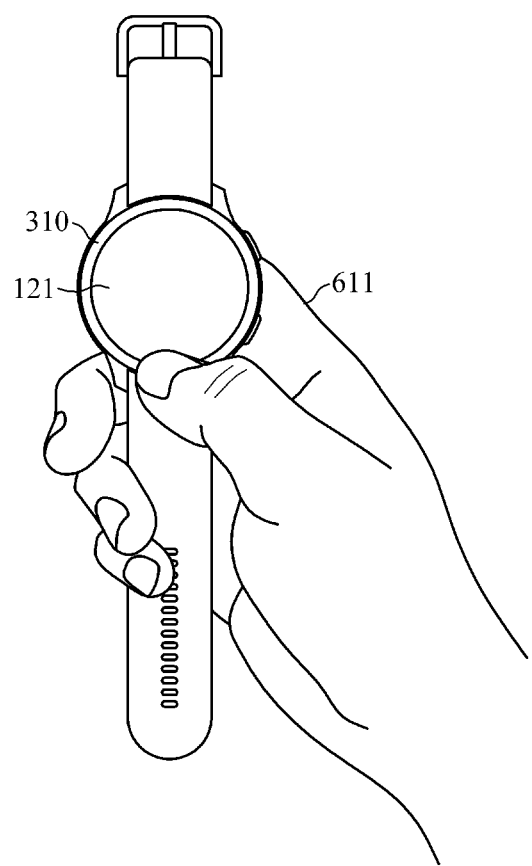
FIGS. 6A to 6D are diagrams explaining an example of guiding a measurement position of a bio-signal.

As illustrated in FIG. 6A, when a user places, for example, an index finger 611 on the sensor 110 disposed on the rear surface of the main body 310 to estimate bio-information, the processor 130 may determine whether the index finger 611 accurately comes into contact with a measurement position of the sensor 110 through the display device 121, and may visually guide the measurement position. In this manner, when placing the index finger on the rear side of the main body 310, the user may easily check a contact state through the display device 121 formed on the front side, without need to flip over the watch.

Figure 6B:
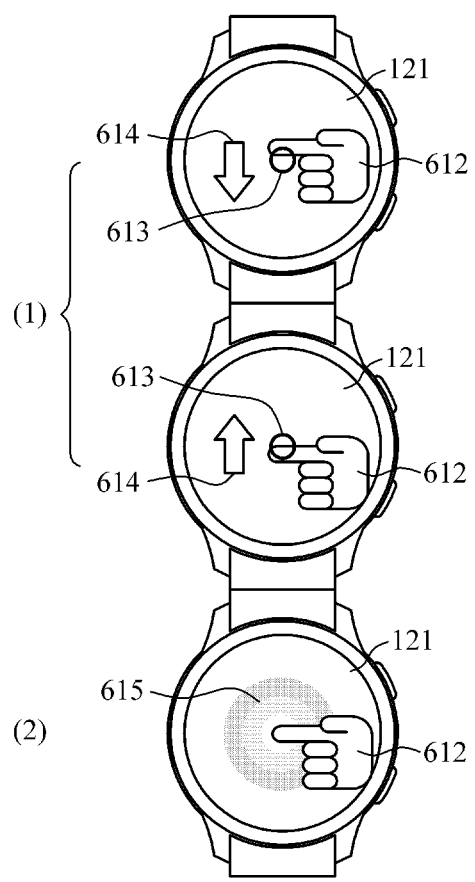

Referring to (1) of FIG. 6B, when a contact position does not coincide with a measurement position, the processor 130 may display, on the display device 121, a graphic object 612 indicating an actual contact position, e.g., the index finger pointing to the contact position. Along with the graphic object 612, the processor 130 may display a graphic object 613 of various shapes, for example, circular shape, crisscross shape, square shape, etc., which indicates the measurement position, and/or a graphic object 614, e.g., an arrow, for guiding movement of the contact position to the measurement position on the display device 121. The process may be repeated until the center of the contact position coincides with the measurement position. In this case, if a distance between the center of the contact position and the center of the measurement position is less than or equal to a predetermined threshold value, the processor 130 may determine that the two positions coincide with each other. In addition, as illustrated in (2) of FIG. 6B, if the contact position coincides with the measurement position, the processor 130 may display a graphic object 615 indicating that the positions coincide with each other.

Figure 6C:
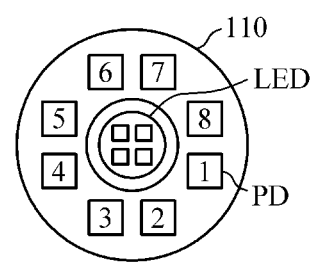
Figure 6D:
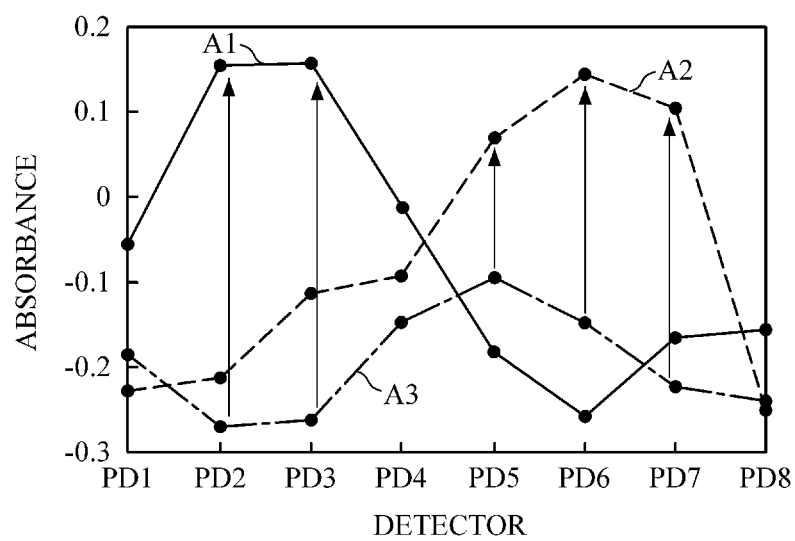

The processor 130 may determine whether the contact position of the finger is in proper contact with the measurement position, based on light quantities measured by a plurality of detectors (a plurality of PDs in the embodiment of FIG. 6C) included in the sensor 110. Referring to FIG. 6C as one embodiment, the sensor 110 may include the light source LED disposed at the center thereof, and the plurality of detectors PD arranged in a concentric circle around the outside of the light source LED. When the index finger is placed on the sensor 110, the processor 130 may calculate absorbances for the respective detectors PD by using the light quantities detected by the respective PDs as shown in the above Equation 1, and may determine the contact position based on the calculated absorbances. For example, FIG. 6D illustrates the absorbances measured by the respective PDs at each contact position. It can be seen from A1 that the finger mainly comes into contact with the upper portion of the sensor 110 of FIG. 6C, such that relatively small light quantities are detected by the detectors PD2 and PD3 at the lower portion which is not in contact with the finger, and thus the measured absorbances at the lower portion are relatively greater than the other detectors. Likewise, it can be seen from A2 that the finger mainly comes into contact with the lower portion of the sensor 110, such that absorbances measured by the detectors PD6 and PD7 at the upper portion are relatively greater than the other detectors. It can be seen from A3 that when the finger relatively accurately comes into contact with the sensor 110, all the detectors may measure relatively uniform absorbance.

When the respective detectors PD calculate absorbances to determine whether the contact position of the finger coincides with the measurement position, the processor 130 may control the light source 111 to emit light in only one specific wavelength range. In another example, when the respective detectors PD calculate absorbances to determine whether the contact position of the finger coincides with the measurement position, the processor 130 may control the light source 111 to sequentially emit light in different wavelength ranges, in which case the respective detectors PD may calculate absorbances for each wavelength range.

For example, if all the absorbances calculated by the respective PDs are less than a threshold value, the processor 130 may determine that the contact position of the user's finger is in proper contact with the measurement position. In this case, the threshold value may be a predetermined value smaller than zero. If the light source 111 emits light in different wavelength ranges, different threshold values to be compared with the absorbances may be used for each wavelength range. Obviously, the processor 130 may also determine whether the contact position of the user's finger coincides with the measurement position by using the same threshold value regardless of wavelength ranges of light emitted by the light source 111.

In another example, if all the light quantities, measured by the respective detectors PD, are greater than a threshold value, the processor 130 may determine that the contact position of the user's finger is in proper contact with the measurement position. In this case, the threshold value may be a predetermined value greater than zero.

FIGS. 7A to 7D are diagrams explaining an example of guiding measurement pressure for measuring a bio-signal.

Figure 7A:
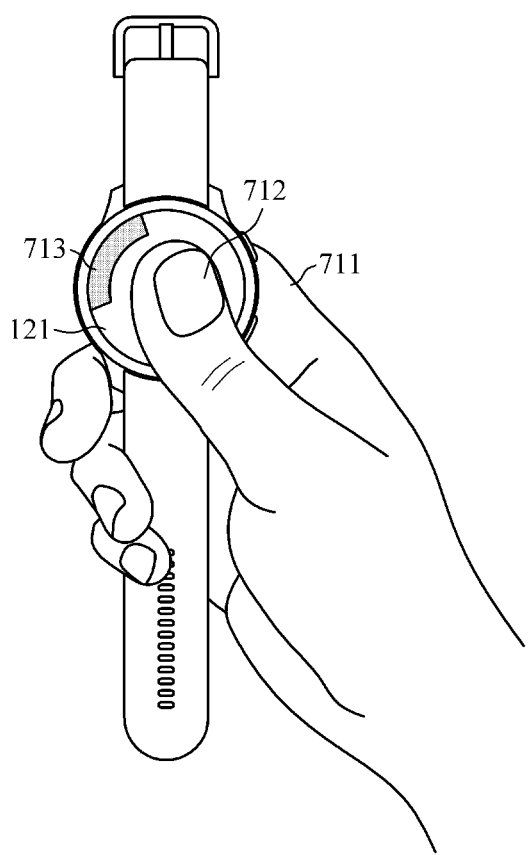
FIGS. 7A to 7D are diagrams explaining an example of guiding measurement pressure for measuring a bio-signal.

When a user places the thumb and the index finger on a front surface (portion of the display device 121) and a rear surface (portion of the sensor 110) of the main body 310 of the watch-type wearable device as illustrated in the embodiment of FIG. 7A, the processor 130 may measure force or pressure, applied by the user, by using a force sensor or a pressure sensor disposed at a lower end of the display device 121 or the sensor 110.

When the user places the index finger on the measurement position of the sensor 110 according to guide information, the processor 130 may guide the user on a contact pressure through the display device 1221. As illustrated in FIG. 7A, if the user places a thumb 712 on the display device 121 for applying pressure to the index finger 711 being in contact with the sensor 110, the processor 130 may display a graphic object 713 in the form of a pressure gauge outside a region of the display device 121 being in contact with the thumb 712. The pressure gauge displays markings or a bar indicative of reference pressure to be applied over time, and/or marking or a bar indicative of an actual contact pressure according to pressure applied by the thumb 712, and the markings or the bar may be distinguished by different colors.

Figure 7B:
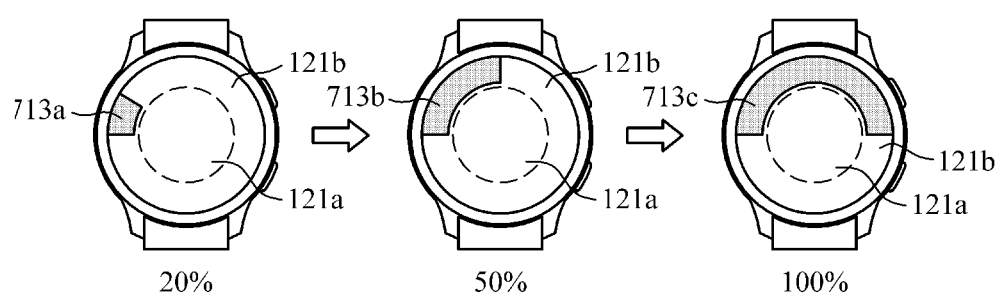
Figure 7C:
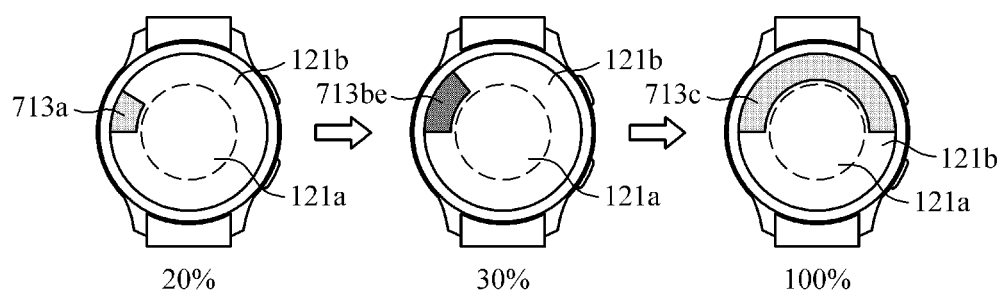
Figure 7D:
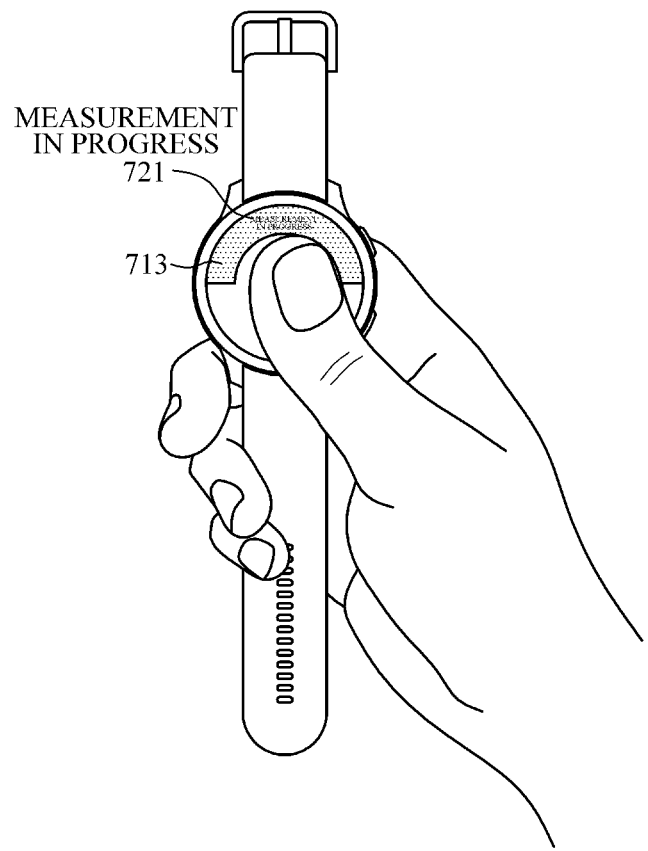

FIGS. 7B to 7D are diagrams illustrating an example of guiding a user to gradually increase pressing pressure over time.

Referring to FIG. 7B, when the thumb comes into contact with a first portion 121a of the display device 121, the processor 130 may display pressure gauges 713a, 713b, and 713c in an outer region 121b, so that the user may adjust a pressing force according to the reference pressure over time, and may display an increased/decreased bar/markings on the pressure gauges according to an increase/decrease of the reference pressure. In this case, the color/shape of the gauges may be displayed in the same color (e.g., blue)/shape regardless of the increase/decrease of the reference pressure. Alternatively, as the reference pressure gradually increases/decreases, the processor 130 may display the markings which gradually change from a light/dark color to a dark/light color or to another color.

In addition, as in the second view of FIG. 7C, if the actual contact pressure (30%) falls outside a normal range (e.g., ±5%) of the reference pressure (50%), the processor 130 may provide alarm information for a user by changing the pressure gauge 713be to another color (e.g., red)/shape or by causing the pressure gauge 713be to flicker for a predetermined period of time. In this case, as a difference between the actual contact pressure and the reference pressure increases, the processor 130 may display the gauge in a darker color or may cause the gauge to flicker faster. In this case, the processor 130 may also provide an alarm as sound to a user through the sound output device.

Referring to FIG. 7D, if pressure applied by the thumb reaches a target measurement pressure according to the guide, the processor 130 may change the color (e.g. blue)/shape of the pressure gauge 713 to another color (e.g., yellow)/shape, and may operate the sensor 110 to measure an optical signal from the index finger placed on the sensor 110. In this case, as illustrated herein, the processor 130 may output a text message 721, indicating that measurement is in progress, on the pressure gauge 713, and at the same time may display the text message 721 as sound through the sound output device.

In one embodiment, the processor 130 may guide whether a user applies an appropriate level of force through a UI displayed on FIG. 7D. In this case, the processor 130 may guide a user to further apply a force using the text message 721, or may notify a user that an appropriate level of force is applied. Alternatively, by changing the color of the graphic object 713 displayed in the outer region of the display device 121, the processor 130 may also guide the user as to whether the user currently applies an appropriate level of force or whether the user needs to apply a greater force.

Further, the processor 130 may provide a user with bio-information measurement progress through the UI illustrated in FIG. 7B. For example, when starting to measure the antioxidant level, the processor 130 may display a circular progress bar which may gradually increase in length over time along the outer region of the display device 121, as shown in the graphic objects 713a, 713b, and 713c of FIG. 7B. The longer progress bar may indicate that the outer region of the display device 121 is gradually filled with a predetermined color. When the measurement of bio-information is complete, the progress bar may stop changing. In the embodiment of FIG. 7B, the graphic object 713 showing a progress bar starts in the 9 o'clock direction and ends in the 3 o'clock direction in the outer region of the display device 121, but the start portion and the end portion are not limited thereto. For example, the graphic object 713 may start in the 9 o'clock direction, may turn full circle of the outer region of the display device 121, and then may end in the 9 o'clock direction again. The change in this embodiment may also be applied to the embodiment of FIG. 7B illustrating the graphic object 713 that displays an applied pressure level. Further, the display device 121 may have a circular shape as illustrated in each embodiment, or although not illustrated herein, the display device 121 may have a square shape with rounded edges. In the case where the display device 121 has a square shape with rounded edges, the graphic object 713 provided along the outer region of the display device 121 may also be displayed in a square shape with rounded edges.

Figure 8A:
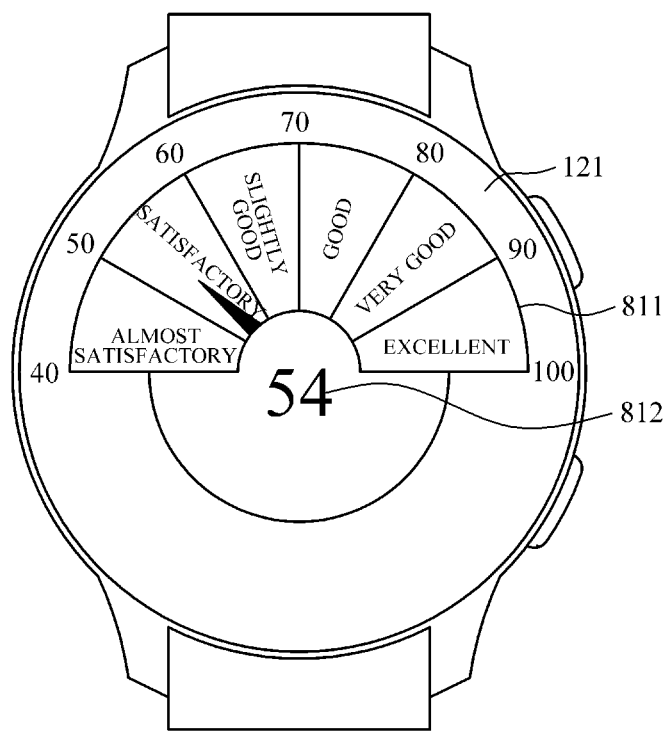
FIGS. 8A to 8C are diagrams explaining an example of outputting a bio-information estimation result.
Figure 8B:
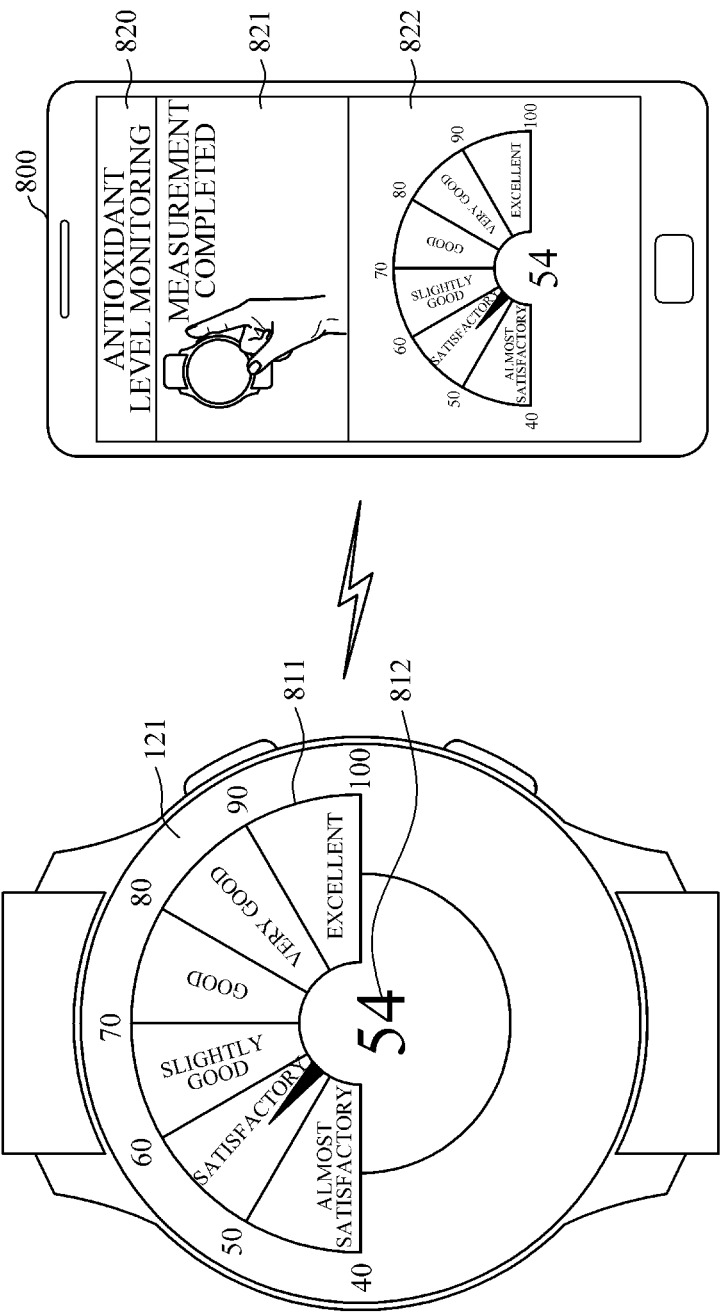
Figure 8C:
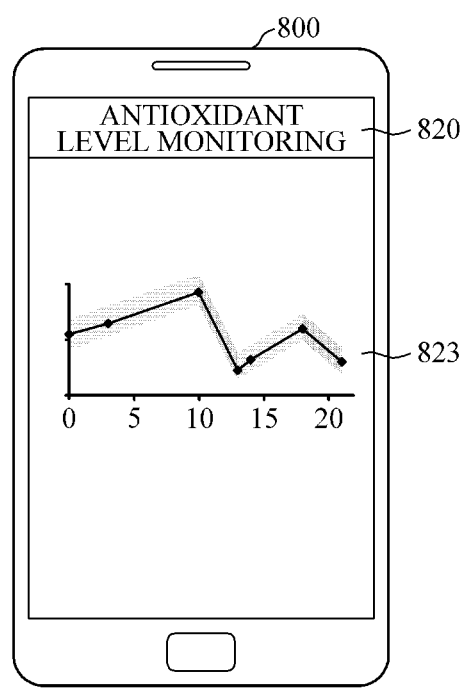

FIGS. 8A to 8C are diagrams explaining an example of outputting a bio-information estimation result.

Once an optical signal is measured from the index finger, the processor 130 may obtain, for example, the antioxidant level, by using the reference light quantity which is obtained based on the measured light quantity and by calibration, and may display the antioxidant level on the display device 121 by using various visual methods, such as a circular chart 811 and/or a text 812 indicating the antioxidant level as illustrated in FIG. 8A, so that a user may easily recognize an estimation result. The processor 130 may estimate the antioxidant level of an object in real time, or at the same time while the sensor 110 is collecting an optical signal from the object.

Further, referring to FIG. 8B, while estimating the antioxidant level and/or when completing estimation of bio-information, the processor 130 may transmit data regarding progress and/or estimation result to the external device 800 through the communication module, and the external device 800 may display a graphic object 821 indicating progress and/or a graphic object 822 indicating an estimation result on the display device 820. In addition, referring to FIG. 8C, the external device 800 may manage results received from the wearable device, and in response to a user' request, the external device 800 may visually display an antioxidant level estimation history in a graph 823.

Figure 9:
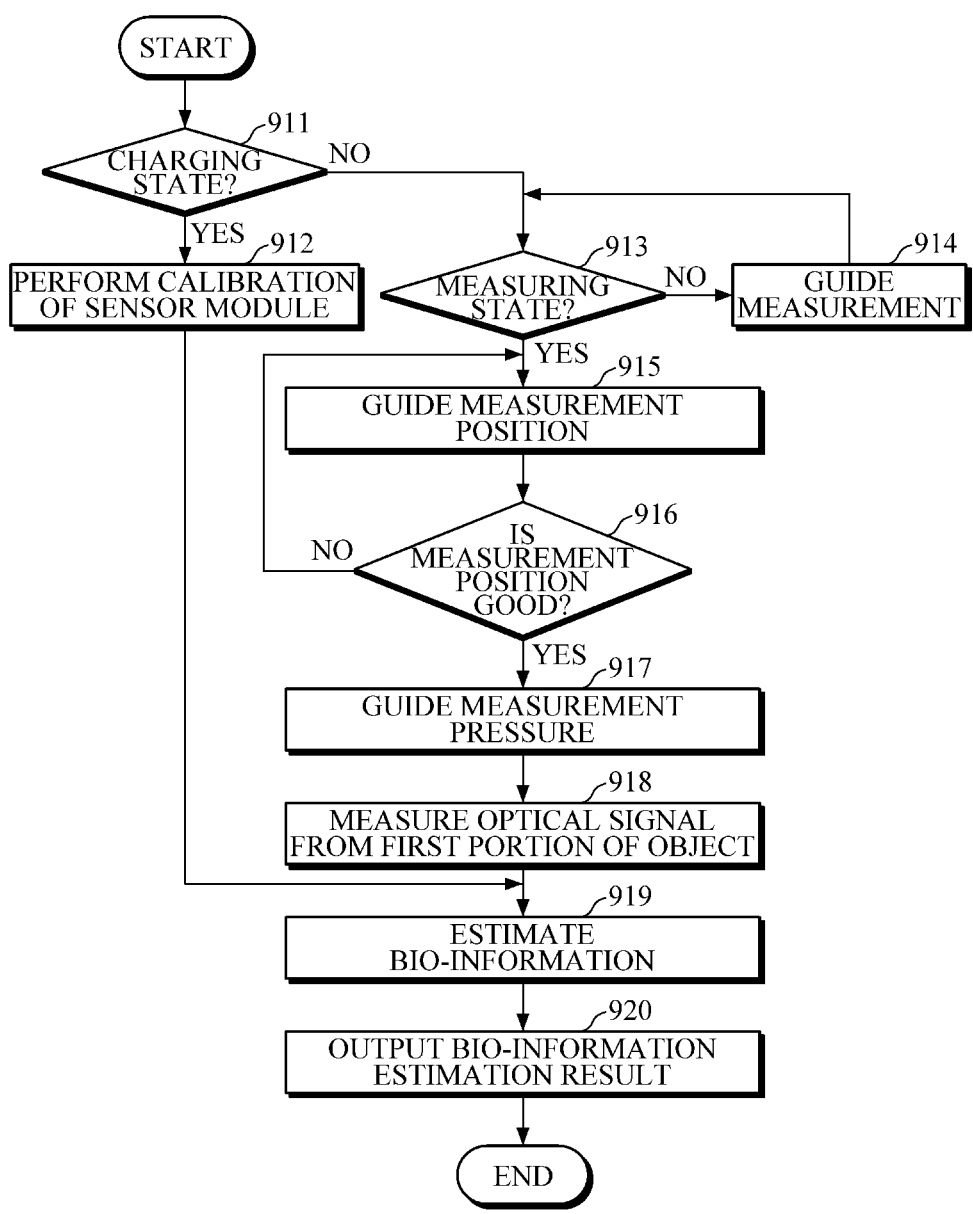
FIG. 9 is a flowchart illustrating a method of estimating bio-information according to an example embodiment of the present disclosure.

FIG. 9 is a flowchart illustrating a method of estimating bio-information according to an example embodiment of the present disclosure.

The method of FIG. 9 is an example of a method of estimating bio-information performed by the electronic apparatuses 100 and 200 of FIGS. 1 and 2, which will be briefly described below in order to avoid redundancy.

First, the electronic device may determine whether the electronic device is in a charging state in operation 911.

Then, when the electronic device is placed on, for example, the charger and charging is started, the electronic device may perform calibration of the sensor by emitting light to a reference object disposed on the charger and then collecting the light reflected from the reference object, in operation 912. During the calibration, the electronic device may measure a reference light quantity of each light source based on the light reflected from the reference object, may store the reference light quantity in the memory to be used in operation 919.

Subsequently, the electronic device may determine whether the electronic device is in a bio-information measuring state in operation 913, and if the electronic device is not in the measuring state, the electronic device may guide a user to measure bio-information in operation 914. For example, when charging is complete after the electronic device is placed on the charger and calibration is performed, or when a user removes the electronic device from the charger to use the electronic device, the electronic device may output a text message, indicating recommendation for estimation, on the display device of the electronic device. Alternatively, by analyzing a predetermined user preferred measurement time or a change in user pattern, the electronic device may determine an estimation recommendation time and may guide the user on the estimation.

Next, upon determination in operation 913 that the electronic device is the measuring state, for example, when the user places a first portion of an object on the sensor for estimating bio-information, the electronic device may guide the user on a measurement position in operation 915. For example, the electronic device may determine a contact position of the first portion of the object being in contact with the sensor, and may guide the user on the measurement position of the sensor through the display device. In this case, based on a difference in quantities of light received by the plurality of detectors, the electronic device may determine the contact position, and may repeat the process until the contact position coincides with the measurement position. For example, the electronic device may determine that the contact position coincides with the measurement position when a distance between the center of a thumb placed on a contact surface of the sensor 110, and the center of the contact surface of the sensor 110, is less than or equal to a threshold value.

Then, once the contact position coincides with the measurement position according to the guide in operation 916, the electronic device may guide the user on the measurement pressure in operation 917. For example, when a second portion of the object presses the display device to apply pressure thereto while the first portion of the object is in contact with the measurement position, the electronic device may display a pressure gauge indicating the applied pressure and/or the reference pressure in an outer region of the display device. In this case, based on a progress stage (e.g., before measurement, during measurement, or after measurement) or a pressurization state, the electronic device may output the graphic object in different colors or shapes.

Subsequently, once the contact pressure reaches a target reference pressure according to the guide, the electronic device may operate the sensor to measure an optical signal from the first portion of the object in operation 918.

Next, the electronic device may estimate bio-information in operation 919 by using the light quantity measured in operation 918 and the reference light quantity obtained in operation 912. For example, the electronic device may calculate absorbance at each wavelength based on a ratio between the measured light quantity and the reference light quantity, may extract a feature value by using the absorbance at each wavelength, and may obtain bio-information by applying the obtained feature value to a predefined estimation model.

Then, the electronic device may provide the user with a bio-information estimation result through the output device in 920. For example, the electronic device may display information, such as an estimated bio-information value, an estimation history graph, recommendations based on the estimated bio-information value, and the like, on the display device and along with the information, the electronic device may provide alarm information by using a sound output device, a haptic device, etc., and may transmit result data and the like to an external device so that the external device may output the data.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
   an optical sensor configured to emit a reference light to a reference object and detect the reference light reflected from the reference object during calibration, and emit a measurement light to a target object and detect the measurement light reflected from the target object during a measurement;
   a display; and
   a processor configured to:
   when the electronic device is placed on a charger and is in a charging state, perform the calibration of the optical sensor based on the reference light reflected from the reference object;
   control the display to output operational instructions for estimating bio-information according to progress stages of the measurement after charging of the electronic device;
   calculate absorbances at each wavelength of the measurement light based on a light quantity of the reference light that is measured during the calibration, and a light quantity of the measurement light measured from the target object;

obtain a feature value based on the absorbances calculated at each wavelength of the measurement light; and estimate the bio-information based on the obtained feature value.

2. The electronic device of claim 1, wherein the optical sensor comprises a light source configured to emit the reference light onto the reference object during the charging state, and a detector configured to detect the reference light reflected from the reference object, wherein the processor is further configured to store calibration information including the light quantity of the reference light, in a memory.

3. The electronic device of claim 1, wherein when charging of the electronic device is complete or when the electronic device is removed from the charger, the processor is configured to output, on the display, a text message that includes the operational instructions.

4. The electronic device of claim 1, wherein the processor is further configured to determine an estimation recommendation time based on a user pattern, and based on a current time corresponding to the estimation recommendation time, output on the display, a text message that includes the operational instructions.

5. The electronic device of claim 1, wherein in response to the target object coming into contact with the optical sensor, the processor is further configured to determine a contact position and request a user to change or maintain the contact position based on a determination of the contact position.

6. The electronic device of claim 5, wherein the processor is further configured to: control the display to display at least one of a first graphic object indicating the contact position of the target object, a second graphic object indicating a predetermined measurement position, a third graphic object indicating a required movement from the contact position to the predetermined measurement position, and a fourth graphic object indicating that the contact position coincides with the predetermined measurement position.

7. The electronic device of claim 5, wherein the optical sensor comprises a light source disposed at a center of the optical sensor, and a plurality of detectors arranged to surround the light source, wherein the processor is further configured to determine the contact position of the target object based on the light quantity of the measurement light measured by the plurality of detectors.

8. The electronic device of claim 1, wherein in response to a first portion of the target object coming into contact with a measurement position of the optical sensor, the processor is further configured to control the display to output a graphic object indicating a contact pressure between the first portion and the optical sensor.

9. The electronic device of claim 8, wherein when a second portion of the target object comes into contact with the display and applies pressure to the display while the first portion is in contact with the optical sensor, the processor is configured to output a pressure gauge in a region other than a contact region of the second portion on the display.

10. The electronic device of claim 8, wherein the processor is further configured to change a color of the graphic object that indicates the contact pressure, according to the progress stages of the measurement.

11. The electronic device of claim 8, wherein the processor is configured to output a text message, indicating a corresponding measurement stage among the progress stages of the measurement.

12. The electronic device of claim 1, wherein the progress stages of the measurement comprise a first progress stage, a second progress stage, and a third progress stage occurring in sequence, and the processor is further configured to:

at the first progress stage, based on a determination that a current contact position of the target object does not correspond to a measurement position of the optical sensor, control the display to output a first graphic object indicating the current contact position of the target object, a second graphic object indicating the measurement position of the optical sensor, and a third graphic object indicating a required movement from the current contact position to the measurement position;

at the second progress stage, based on a determination that the current contact position has aligned with the predetermined measurement position, control the display to output a fourth graphic object indicating that the contact position corresponds to the predetermined measurement position; and at the third progress stage, control the display to output a fifth graphic object indicating a change in a current contact pressure between the target object and the optical sensor, and a sixth graphic object indicating a target contact pressure.

13. The electronic device of claim 1, wherein the processor is further configured to combine the calculated absorbances at each wavelength, obtain an antioxidant peak by correcting a baseline of a waveform, and obtains an antioxidant level based on the obtained antioxidant peak by using a predefined antioxidant level estimation model.

14. A method of estimating bio-information by using an electronic device, the method comprising:

in response to the electronic device being placed on a charger and being in a charging state, performing calibration of an optical sensor by emitting a reference light from the optical sensor to a reference object disposed on the charger, and detecting the reference light reflected from the reference object;

outputting operational instructions for estimating bio-information through a display, according to progress stages of a measurement after charging of the electronic device;

measuring a light quantity of a measurement light that is emitted from the optical sensor to a target object and is detected by the optical sensor after being reflected from the target object;

calculating absorbances at each wavelength of the measurement light based on a light quantity of the reference light that is measured during the calibration, and the light quantity of the measurement light measured from the target object;

obtaining a feature value based on the absorbances calculated at each wavelength of the measurement light; and estimating the bio-information based on the obtained feature value.

15. The method of claim 14, wherein the performing of the calibration comprises:

emitting the reference light onto the reference object by driving a light source of the optical sensor during the charging;

detecting the reference light reflected from the reference object by using a detector of the optical sensor; and storing calibration information, including information of the light quantity of the reference light, in a memory.

16. The method of claim 14, further comprising, when the charging is complete or when the electronic device is removed from the charger, outputting a text message that includes the operational instructions, to the display.

17. The method of claim 14, wherein in response to the target object coming into contact with the sensor, the outputting of the operational instructions comprises determining a contact position and requiring a user to change or maintain the contact position based on a determination of the contact position.

18. The method of claim 14, wherein in response to a first portion of the target object coming into contact with a measurement position of the optical sensor, the outputting of the operational instructions comprises outputting a graphic object, indicating a contact pressure to be applied between the first portion and the optical sensor, to the display.

* * * * *